M. J. MYERS.
JUNCTION BOX.
APPLICATION FILED NOV. 26, 1907. RENEWED APR. 29, 1911.
996,876.
Patented July 4, 1911.
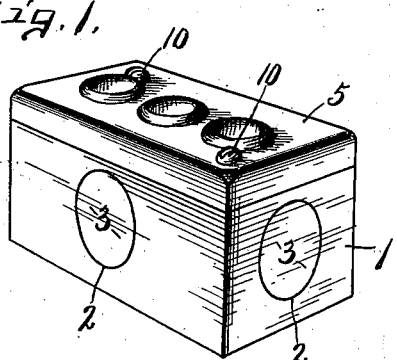
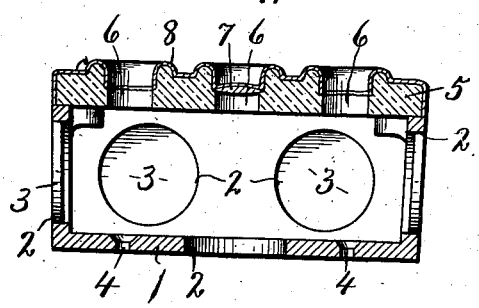 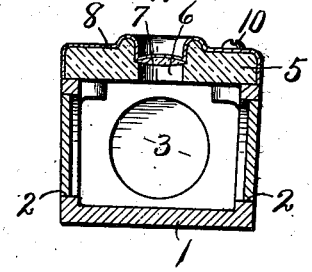
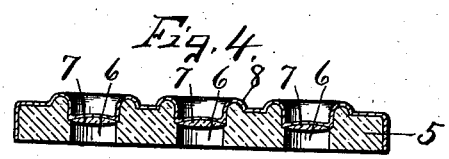
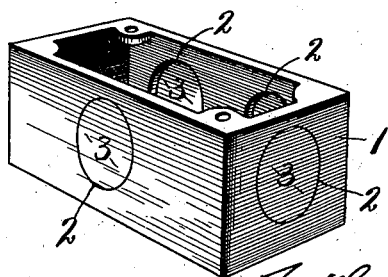
Witnesses.
Inventor.
Matthew Jerris Myers
By
Howard P. Denniston
Attorney.

UNITED STATES PATENT OFFICE.

MATTHEW J. MYERS, OF SYRACUSE, NEW YORK, ASSIGNOR TO B. IVES COOPER, OF SYRACUSE, NEW YORK.

JUNCTION-BOX.

996,876.

Specification of Letters Patent. Patented July 4, 1911.

Application filed November 26, 1907, Serial No. 403,934. Renewed April 29, 1911. Serial No. 624,454.

*To all whom it may concern:*

Be it known that I, MATTHEW JERVIS MYERS, of Syracuse, in the county of Onondaga, in the State of New York, have invented new and useful Improvements in Junction-Boxes, of which the following, taken in connection with the accompanying drawings, is a full, clear, and exact description.

This invention relates to certain improvements in junction boxes for electric conductors adapted to be placed in the side walls or ceiling of a room where these conductors are usually brought together for connection with some electrical fixture or translating device and may also be utilized for the reception of fuse wires, lightning arresters and similar connections in the electric circuit.

In the installation of a system of wiring the electric conductors branching off to different parts of the building are usually passed through suitable pipes or housings of fire proof material leading to the portion of the wall or ceiling where it is desired to provide attachments for suitable fixtures. These junction boxes are usually secured in the proper position in the walls or ceiling during the course of construction with one side exposed to the interior of the room so that the plaster may be finished against the sides and ends of the box and in view of the fact that the electric conductors are frequently brought to the box from different directions, the back, sides and ends of such box are each provided with one or more normally closed openings, either of which may be readily opened at will to receive the entering wire nearest thereto, the remaining openings being left closed to protect the walls or ceilings from exposure to electric sparks or arcs from short circuits which may occur within the box.

The cap or cover for the open side of the box is preferably made of porcelain or other suitable insulating material for the purpose of giving a neat finish to the side of the box exposed to the interior of the room. These caps or covers are usually provided with an indefinite number of openings or outlets for the branch wires leading to the fixtures or translating devices and one of the main objects of my present invention is to provide such caps with integral closures for the openings, that is to mold the closures in the openings in such manner that they may be readily disintegrated or detached from the main body of the cap. In order to do this, the closures are made of fragile material held in place at their meeting edges by a thin web forming the outer finishing surface of the cap.

My special object, therefore, is to unite or join the closures in their respective openings to the main body of the cap by thin webs of some fragile substance as porcelain or glaze, capable of being broken under comparatively light pressure so that one or more of the caps may be easily and quickly removed leaving the other closures permanently in place so that only such are removed as may be necessary to accommodate what branch conductors may be connected to the fixture.

Other objects and uses will be brought out in the following description.

In the drawings—Figure 1 is a perspective view of a junction box embodying the various features of my invention. Figs. 2 and 3 are respectively longitudinal and transverse sectional view through the box seen in Fig. 1. Fig. 4 is a longitudinal sectional view of the porcelain cap seen in Figs. 1, 2 and 3 showing all of the closures in their original position as molded with the cap. Fig. 5 is a perspective view of the detached box omitting the cap.

In order to demonstrate the practicability of my invention I have shown a substantially rectangular box —1— having its bottom, sides and ends provided with openings —2— in which are more or less tightly fitted disk closures —3— capable of being readily removed under slight pressure but normally self-retained by friction with the sides of the opening. This box together with the disk closures —3— may be made of metal or any other suitable fire proof material and may also be of any form or size capable of being secured in the wall or ceiling of a building.

In practice the bottom of the box —1— is provided with screw holes —4— for receiving screws or other suitable fastening means, not shown, by which the box may be secured to the studding or lath with its open side facing the interior of the room and substantially flush with the plaster.

The open side of the box is covered by a suitable cap —5— of porcelain or other insulating material capable of giving a pleasing external appearance, said cap being provided with a plurality of, in this instance, three apertures —6— which are normally closed by comparatively thin diaphragms or partitions —7— usually of the same material and molded integral with the cap when the latter is formed.

The edges of the closures or diaphragms —7— where they are joined to the main body of the cap are preferably very thin and fragile so that the diaphragms may be readily disintegrated or displaced under slight pressure or a light blow with a suitable instrument without leaving objectionable ragged edges around the sides of the opening. In practice I have found it convenient to retain these diaphragms or closures —7— in position by a thin veneering —8— of glaze which not only covers the outer surface of the cap but also covers the surface of the closures —7— and forms a junction at the edges of said closures with the main body of the cap to hold the latter in position and at the same time affords a thin web of fragile and easily breakable material capable of being disintegrated under light pressure to afford a passage entirely through one or more of the openings through which it may be desired to pass one or more of the electrical conductors.

The main wires are brought through one or more of the openings —2— by removing the necessary closure or closures —3— leaving the remaining closures intact thereby affording practically a closed box inclosing the junction of the wires while the wires which are attached to the fixtures in the room are brought out from the interior of the box through one or more of the openings —6— in the cap, the remaining openings —6— being left closed.

This cap may be secured to the open side of the box by any suitable fastening means as screws —10— which are passed through apertures in diagonal corners of the cap and engaged with threaded apertures in corresponding corners of the box.

The principal feature of my invention consists in providing the cap with one or more openings and with a corresponding number of integral comparatively thin diaphragms or closures for said opening, said closures being united to the main body of the cap by thin webs of fragile material capable of being broken under light pressure so that one or more of the closures may be disintegrated to permit a corresponding number of wires to be drawn through the corresponding openings.

What I claim is:

A junction box having a body portion and a cap therefor of insulating material provided with a plurality of openings, a closure for each of the openings, said closures interposed between and connected to the walls of the openings by a comparatively thin web of fragile material, said closures positioned approximately centrally of the openings, and a thin veneer of glaze covering the outer surface of the cap, that portion of the walls of the openings above the closures and the outer surface of the closures, said veneer at the sides of the cap being flush with the outer face of the body portion of the box.

In witness whereof I have hereunto set my hand this 18th day of November 1907.

M. J. MYERS.

Witnesses:
MILDRED M. NOTT,
CAROLINE M. McCORMACK.